United States Patent [19]

Edwards, deceased et al.

[11] Patent Number: 4,652,382
[45] Date of Patent: Mar. 24, 1987

[54] PROCESS AND APPARATUS FOR CONTINUOUSLY TREATING SEWAGE WASTEWATER BY CHEMICAL OXIDATION

[75] Inventors: Richard N. Edwards, deceased, late of Raleigh, N.C., by Katherine Elliot Edwards, co-executrix; Richard N. Edwards, Jr., co-executor, Charlotte, N.C.

[73] Assignee: International Waste Water Reclamation Technologies, Inc., Hamlin, Pa.

[21] Appl. No.: 663,086

[22] Filed: Oct. 19, 1984

[51] Int. Cl.⁴ .............................................. C02F 1/78
[52] U.S. Cl. .................................... 210/752; 210/760; 210/197; 210/199; 210/219
[58] Field of Search ............... 210/752, 760, 765, 197, 210/199, 219, 220, 218

[56] References Cited

U.S. PATENT DOCUMENTS

| | | | |
|---|---|---|---|
| 2,872,415 | 2/1959 | Schleyer et al. | 210/63 |
| 3,311,239 | 3/1967 | Valdespino | 210/195 |
| 3,336,016 | 9/1967 | Schreiber | 261/123 |
| 3,371,033 | 2/1968 | Simmons et al. | 210/3 |
| 3,709,363 | 1/1973 | Smart, IV et al. | 210/197 X |
| 3,724,667 | 4/1973 | McKinney | 210/219 X |
| 3,772,188 | 11/1973 | Edwards | 210/197 X |
| 3,872,003 | 3/1975 | Walker | 210/199 X |
| 3,904,714 | 9/1975 | Rooney et al. | 210/219 X |
| 3,936,381 | 2/1976 | Pacaud | 210/219 X |
| 3,954,606 | 5/1976 | Block et al. | 261/91 X |
| 4,021,347 | 5/1977 | Teller et al. | 210/199 X |
| 4,036,754 | 7/1977 | Peasley | 210/220 X |
| 4,054,524 | 10/1977 | Mackrle et al. | 210/220 X |
| 4,070,292 | 1/1978 | Adams | 210/220 X |
| 4,139,457 | 2/1979 | Mackrle et al. | 210/220 X |
| 4,179,375 | 12/1979 | Smith | 210/197 |
| 4,405,456 | 9/1983 | Kinzer et al. | 210/197 X |
| 4,487,699 | 12/1984 | Long, Jr. | 210/197 X |

OTHER PUBLICATIONS

"Waste Age"; New Jersey City Experiments with Sludge Disposal Process; pp. 37-38.
"Oxyozosynthesis"; by Paul Bolon.

Primary Examiner—Tom Wyse
Attorney, Agent, or Firm—Bell, Seltzer, Park & Gibson

[57] ABSTRACT

An improved process and apparatus for continuously treating sewage wastewater by chemical oxidation of the contaminates and characterized by a high degree of oxygen absorption and utilization. An enclosed vessel continuously receives liquid wastewater at one end thereof to define a liquid level and the treated sewage is continuously removed from the other end to maintain the liquid level. Oxygen gas in the form of a mixture of $O_2$ and $O_3$ is introduced under pressure into the vessel, while pressurizing the vessel and creating an oxygen-rich atmosphere in an upper portion of the vessel, to chemically treat the wastewater through absorption of the oxygen by the wastewater. The wastewater is circulated from the lower portion of the vessel through the oxygen-rich atmosphere and directed in a stream against a driven rotating impeller for breaking the wastewater into a myriad of small particles and forcibly impelling the particles downwardly through the oxygen-rich atmosphere to strike the upper surface of the wastewater in the vessel and create a turbulent zone at the upper surface of the wastewater to increase oxygen absorption. The wastewater is hydraulically mixed by a helical flow of the wastewater created through the lower portion of the vessel from the one end to the other for further changing the interface between the wastewater and the oxygen to increase wastewater absorption.

16 Claims, 7 Drawing Figures

PROCESS AND APPARATUS FOR CONTINUOUSLY TREATING SEWAGE WASTEWATER BY CHEMICAL OXIDATION

FIELD OF THE INVENTION

This invention relates to an improved process and apparatus for continuously treating sewage wastewater by chemical oxidation of the contaminants and characterized by a high degree of oxygen absorption and utilization.

BACKGROUND OF THE INVENTION

Applicant's U.S. Pat. No. 3,772,188, issued Nov. 13, 1973, sets forth an apparatus and method for treating sewage wastewater by chemical oxidation of the contaminates which greatly improves prior processes and apparatus utilized in municipal and industrial sewage wastewater treatment facilities. The background of prior sewage wastewater treatment processes and apparatus, as well as Applicant's prior chemical oxidation process and apparatus, are fully set forth in Applicant's prior patent and are incorporated herein by reference and a reading of that patent will provide all such background.

While the chemical oxidation process and apparatus described in Applicant's prior patent operated satisfactory, it has been subsequently determined that a sufficiently high degree of oxygen absorption and utilization for chemical oxidation of the contaminants during treatment of the sewage wastewater was not obtained to make such process and apparatus economically practical.

OBJECT AND SUMMARY OF THE INVENTION

Accordingly, it is the object of this invention to improve the process and apparatus of Applicant's aforesaid prior patent to overcome the above discussed problem and to obtain an economically satisfactory, high degree of oxygen absorption and utilization in such chemical oxidation process and apparatus.

By this invention, it has been found that these objects may be accomplished by providing a continuous treatment process and apparatus wherein liquid sewage wastewater to be treated is continuously deposited at one end of an elongate enclosed vessel to define a liquid level having an upper surface within the vessel and in which the treated wastewater is continuously removed from the other end of the vessel at generally the same rate as the wastewater is deposited in the vessel to maintain the desired liquid level within the vessel. Oxygen under pressure in the form of a mixture of $O_2$ and $O_3$ is supplied to the vessel to chemically treat the wastewater by absorption of the oxygen by the wastewater, while pressurizing the vessel and creating an oxygen-rich atmosphere in an upper portion of the vessel above the liquid level. Preferably, the oxygen mixture is diffused into the wastewater in the lower portion of the vessel in tiny bubbles to bubble-up through the wastewater to the oxygen-rich atmosphere in the upper portion of the vessel, while being partially absorbed by the wastewater during such diffusing. This arrangement also aids in hydraulically mixing the wastewater for further increasing oxygen absorption, as will be discussed below.

The wastewater is continuously circulated from the lower portion of the vessel through the oxygen-rich atmosphere in the upper portion of the vessel by withdrawing a portion of the wastewater from the lower portion of the vessel and expelling the wastewater in a stream upwardly through the oxygen-rich atmosphere in the upper portion of the vessel The stream of wastewater is directed against an independently driven, rotating impeller device positioned at generally the top of the upper portion of the vessel for breaking the wastewater into a myriad of small particles and impelling the particles downwardly through the oxygen-rich atmosphere in the upper portion of the vessel in a generally straight-line path of travel and at a velocity greater than that which would be produced by the particles falling by the force of gravity to strike the upper surface of the wastewater in the lower portion of the vessel with sufficient force for creating a turbulent zone at the upper surface of the wastewater.

Preferably, the impeller device is in the form of a generally conical-shaped member extending downwardly and generally along the longitudinal axis of the stream of wastewater, and a plurality of fins extending around the outside of the base of the conical member and being of different lengths and positioned at different angles with respect to the longitudinal axis of the stream of wastewater for striking the particles of wastewater generally tangentially and causing the particles of wastewater to spin during the impelling of the particles downwardly through the oxygen-rich atmosphere for increased absorption of the oxygen by the wastewater.

The wastewater is hydraulically mixed for further increasing oxygen absorption by creating a generally helical flow of the wastewater through the lower portion of the vessel from the one end to the other end for further changing the interface between the wastewater and the oxygen at the upper surface of the wastewater.

As may be seen by the above summary of the invention, the process and apparatus of this invention improve upon the process and apparatus of Applicant's prior above identified patent by substantially increasing oxygen absorption by the wastewater through initially providing oxygen in the form of a mixture of both $O_2$ and $O_3$ into the pressurized vessel. This improves oxygen absorption by the wastewater and thus chemical treatment thereof, for the reasons to be more fully discussed below.

Additionally, the process and apparatus of this invention utilizes a specially designed, independently driven impeller device, in lieu of the freely rotatable comminutor device of the prior patent. The impeller device of the present invention not only breaks up the wastewater into small particles, but also impels the particles downwardly through the oxygen-rich atmosphere in a specific pattern and at a velocity greater than that which would be produced by the particles falling by the force of gravity. This action impels the particles against the upper surface of the wastewater and creates a turbulent zone at the upper surface of the wastewater. These features further increase oxygen absorption and thus improves chemical treatment of the wastewater, as will be discussed in more detail below.

Further, increased hydraulic mixing of the wastewater is obtained by the process and apparatus of this invention, which also increases oxygen absorption by changing the interface between the wastewater and the oxygen at the upper surface of the wastewater, as will be more fully discussed below.

BRIEF DESCRIPTION OF THE DRAWINGS

Some of the objects and advantages of this invention having been stated, other objects and advantages will appear as the detailed description of a preferred embodiment of this invention is given in conjunction with the accompanying drawings, in which.

DETAILED DESCRIPTION OF PREFERRED EMBODIMENT OF THE INVENTION

Referring now to the drawings, there is illustrated therein a preferred embodiment of an apparatus constructed in accordance with this invention for practicing the process of this invention. Some of the figures of the drawings are somewhat schematic and diagrammatic and do not include all of the devices utilized in the apparatus of this invention; however, the drawings are intended to illustrate the improvements in the process and apparatus of this invention over the apparatus and process of Applicant's above discussed prior U.S Pat. No. 3,772,188, which has been incorporated herein by reference, and further details of ancillary devices and process criteria which are common to both Applicant's prior patent and the present invention will not be repeated herein. Also, the improvements of the process and apparatus of this invention may be utilized in other apparatus and the apparatus illustrated in the drawings and to be described here is exemplary of a preferred form of apparatus in accordance with this invention.

Figure 1:
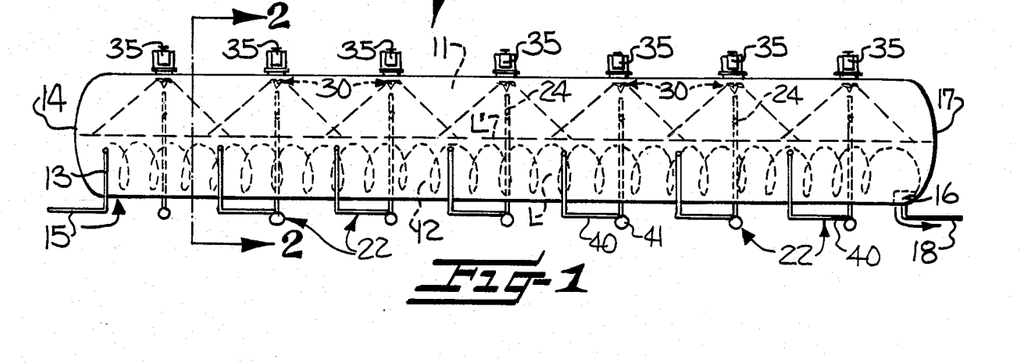
FIG. 1 is a schematic, longitudinal, sectional view through an apparatus constructed in accordance with this invention.

Referring to FIG. 1 of the drawings, the process and apparatus of this invention utilizes an elongate enclosed treatment vessel 10 which may be of generally cylindrical shape defining a lower portion 11 and an upper portion 12. The vessel 10 includes inlet means 13 at one end 14 thereof which may be in the form of a conduit 15 for continuously receiving liquid wastewater to be treated and which may be pumped from a supply or other source (not shown) into the lower portion 11 to define a liquid level L having an upper surface L' so that the liquid wastewater consumes the lower portion 11 of the vessel 10 and approximately half of the capacity of the vessel 10. The vessel 10 further includes an outlet means 16 at generally the other end 17 thereof which may be in the form of a conduit 18 for continuously discharging the treated wastewater after passing longitudinally through the vessel 10 and at generally the same rate as the wastewater is deposited in the vessel 10 to maintain the desired liquid level L' within the vessel 10.

Means are connected to the vessel 10 for supplying oxygen gas under pressure in form of a mixture of $O_2$ and $O_3$ into the vessel 10 for pressurizing the vessel 10 and creating an oxygen-rich gas atmosphere O in the upper portion 12 of the vessel above the upper surface L' of the liquid level L of the wastewater. This oxygen supply means is preferably in the form of gas diffusing tubes 21 of the improved type disclosed in Applicant's copending U.S. patent application Ser. No. 662,702, filed Oct. 19, 1984 and reference may be had to that copending application for a full disclosure of the construction of such gas diffusing tubes 21. The gas diffusing tubes 21 receive the oxygen mixture under pressure from a source (not shown) and are positioned adjacent the interior wall of the vessel 10 in the lower portion 11 and below the upper surface L' of the liquid level L of wastewater to expel a multitude of tiny bubbles of the oxygen mixture in the wastewater to bubbleup through the wastewater for being partially absorbed by the wastewater and for pressurizing the vessel 10 and for creating the oxygen-rich atmosphere O in the upper portion 12 of the vessel 10 above the liquid level L.

As will be noted in Applicant's aforesaid prior patent, the vessel 10 was divided into two separate compartments with the first compartments receiving and containing oxygen in the form of $O_2$ and the second downstream compartment containing oxygen in the form of a mixture of $O_2$ and $O_3$. In accordance with this invention, it was found that the wastewater in the first compartment became supersaturated with $O_2$ (160 ppm to 200 ppm) and the only gas going into solution in the second compartment was that which would replace the gas consumed. Although $O_3$ is theoretically many times more soluble than water than $O_2$, the $O_3$ will not go into solution when the liquid has become supersaturated with $O_2$. Accordingly, it was found by this invention that not enough $O_3$ was transferred into solution in the process and apparatus of Applicant's prior patent to provide the desired treatment of bacteria in the wastewater.

Therefore, in accordance with the present invention, the reactor vessel 10 is not separated into separate compartments and an oxygen mixture of $O_2$ and $O_3$ is contained throughout the vessel for a high degree of absorption and utilization and improvement in the chemical treatment process of the wastewater.

The process and apparatus of this invention further utilizes circulation means 22 for continuously withdrawing wastewater from the lower portion 11 of the vessel 10 and expelling a stream S of such wastewater up through the oxygen-rich atmosphere O in the upper portion 12 of the vessel 10. This circulation means may comprise an outlet 23 at the bottom of the lower portion 11 of the vessel, interconnected conduits 24 extending from the exit 23 around a portion of the outside of the vessel 10, back into the vessel 10 and upwardly through the upper portion 12 of the vessel 10 (as may be seen particularly in FIG. 2). Suitable driven pump means 25 are positioned in the conduits 24 for such circulation of the wastewater.

Figures 5, 6, 7:
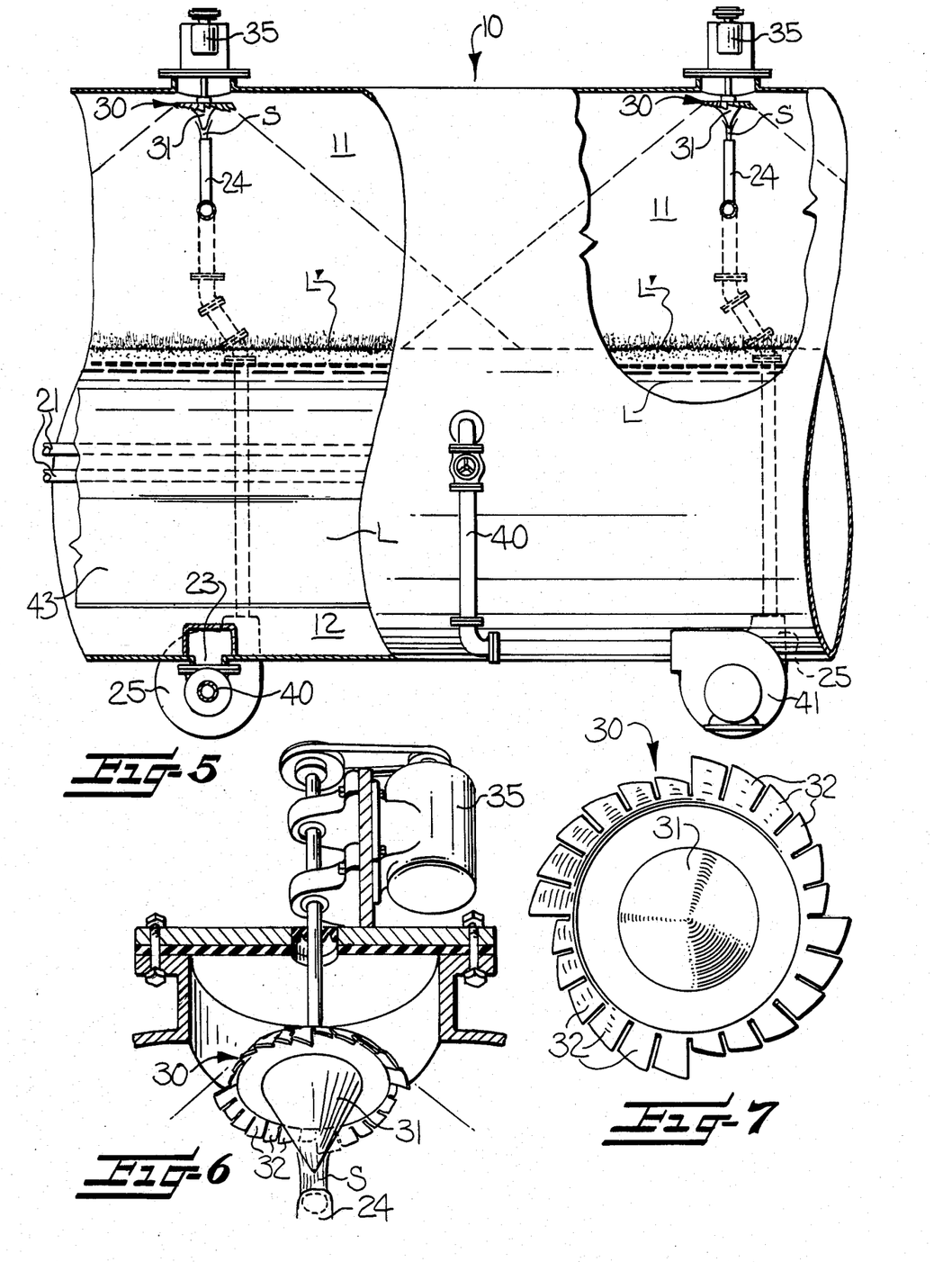
FIG. 5 is a partial elevational view with a portion broken away of part of the apparatus illustrated in FIGS. 1 and 2 and taken generally at the location of the arrow 5 in FIG. 2.
FIG. 6 is a perspective detail of the impeller mechanism of this invention.
FIG. 7 is a bottom plan view looking up at the impeller device illustrated in FIG. 6.

A rotating impeller device 30 is positioned at generally the top of the upper portion 12 of the vessel 10 and in the path of the stream S of wastewater expelled by the circulation means 22 This impeller device 30 preferably comprises a generally conical-shaped member 31 extending downwardly toward and generally along the longitudinal axis of the stream S of wastewater being expelled by the circulation means 22 and generally perpendicular to the upper surface L' of the liquid level L of the wastewater. The impeller device 30 further includes a plurality of fins 32 extending around the outside of the base of the conical member 31 and are of different lengths and positioned at different angles with respect to the longitudinal axis of the stream S of wastewater (as shown particularly in FIGS. 2, 3, 6 and 7). The impeller device 30 is driven by any suitable mechanism which may comprise a suitable motor 35. To keep the rotating impeller device balanced, an equal number of fins will be set at the same angle and have the same length as they are spaced around the base of the conical-shaped member (as illustrated particularly in FIG. 7).

It has been previously established that the transfer of a gas into a liquid body is limited by the saturation of gas at the point of interface between the gas and the liquid. In a quiescent interface, the liquid at the point of interface will become saturated, while the liquid below the interface will be less than saturated. A particle of liquid that has a gas saturated surface or interface will have much less than a saturated innerliquid. Constantly changing or rearranging the molecules of liquid at the interface between the liquid and gas with molecules of liquid not in direct contact with the gas provides a condition for more rapid transfer of gas into the main body of the liquid for complete saturation of the entire body of the liquid.

Figure 4:
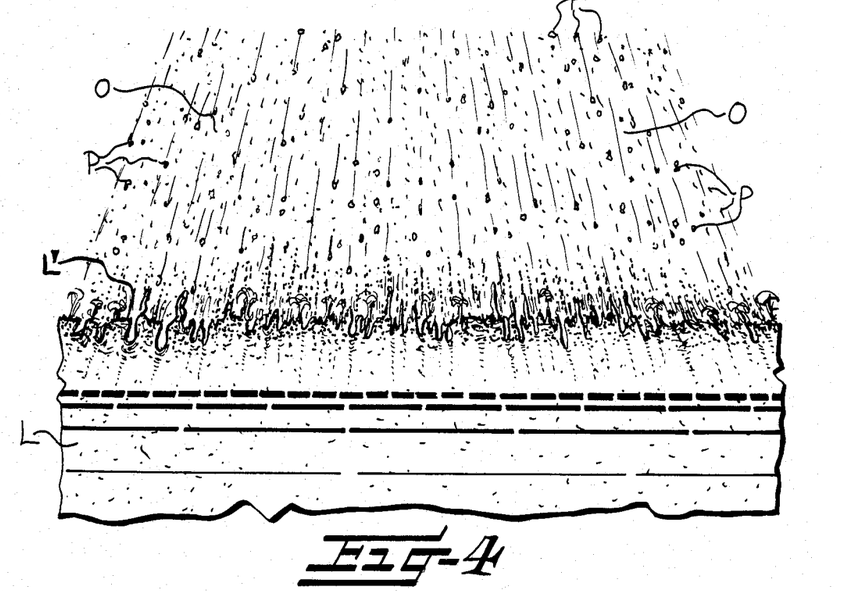
FIG. 4 is a schematic view showing the impelled particles of wastewater striking the upper surface of the wastewater and creating a turbulent zone.

With the above described construction of a driven rotating impeller 30, the stream S of wastewater will be broken up into a myriad of small particles P and the particles P impelled downwardly in a generally straight-line path of travel for creating a generally conical pattern of particles P and at a velocity greater than that which would be produced by the particles falling by the force of gravity, so that the impelled particles will strike the upper surface L' of the liquid level L of the wastewater in the lower portion 11 of the vessel 10 with sufficient velocity to create a turbulent zone (as shown particularly in FIG. 4). As the particles P of wastewater are broken up by the impeller device 30, the individual particles P are struck by the fins 32 in an action which is sometimes referred to as a "chop shot" whereby a generally tangential force is applied to the individual particles causing such particles to spin as they are impelled through the oxygen-rich atmosphere O against the upper surface L' of the Liquid level L of the wastewater.

The breaking up of the wastewater into many small particles P and causing of the particles P to spin as they are impelled through the oxygen-rich atmosphere substantially increases the interfacial area between the wastewater and the oxygen gas for increased oxygen absorption by the wastewater and thus improved treatment of the wastewater. The creation of the turbulent zone at the upper surface L' of the liquid level L of the wastewater and several inches deep in the wastewater constantly changes and increases the interface between the wastewater and the oxygen, as compared to a quiescent interface, which also increases oxygen absorption by the wastewater and thus improves treatment of the wastewater.

The process and apparatus of this invention further includes means for hydraulically mixing the wastewater to increase oxygen absorption by further changing the interface between the wastewater and the oxygen at the upper surface L' of the liquid level L of the wastewater. This hydraulic mixing means includes interconnected conduits 40 having a suitable driven pump 41 therein and extending from the conduit 22 or exit 23 of the wastewater from the lower portion 11 of the vessel 10 for separating a portion of the wastewater withdrawn from the lower portion 11 of the vessel 10 and extending around a portion of the outside of the vessel 10 and back into the vessel 10 in the lower portion 11 at a point upstream or in advance of the point at which the wastewater is withdrawn and at a downwardly extending angle to the upper surface L' of the liquid level L of wastewater (as shown in FIG. 2) to create a generally helical flow of the wastewater through the lower portion of the vessel from the one end 14 to the other end 17 (as diagrammatically indicated in FIGS. 1 and 2).

Figure 2:
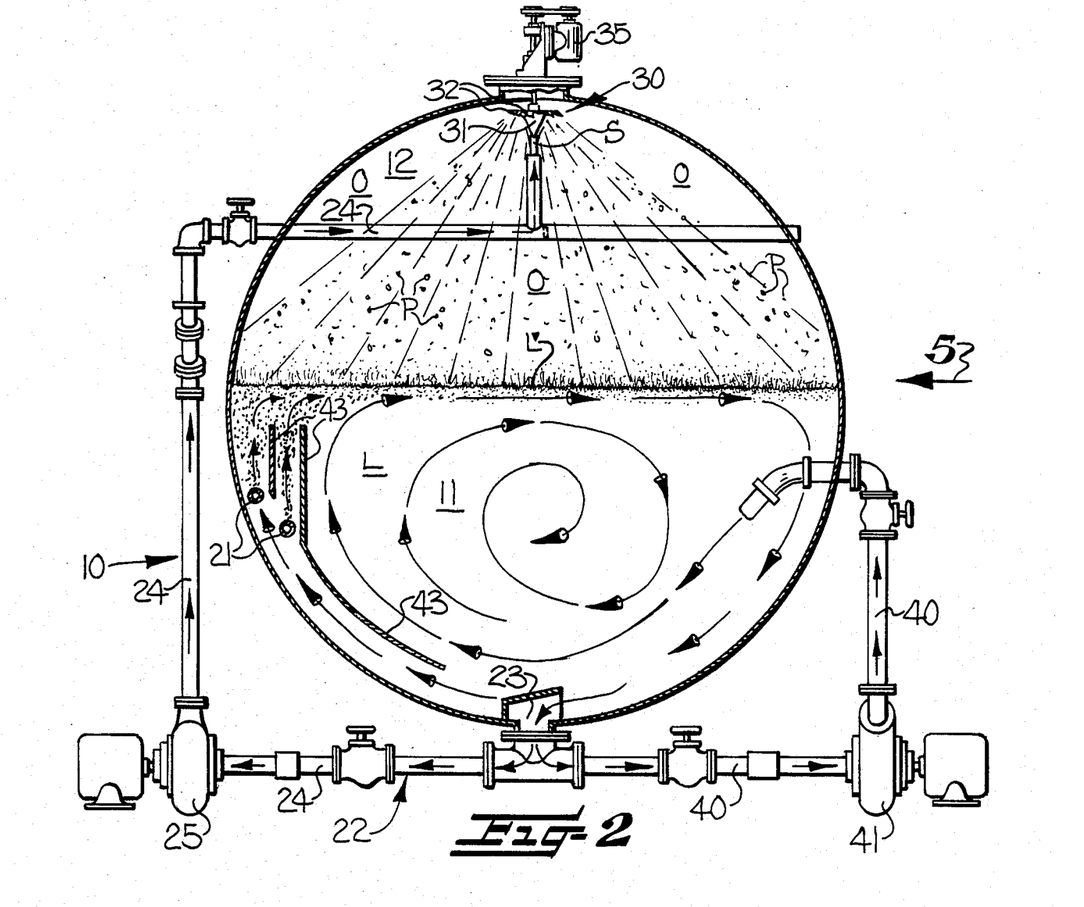
FIG. 2 is an enlarged, sectional view, taken generally along the line 2—2 of FIG. 1.
Figure 3:
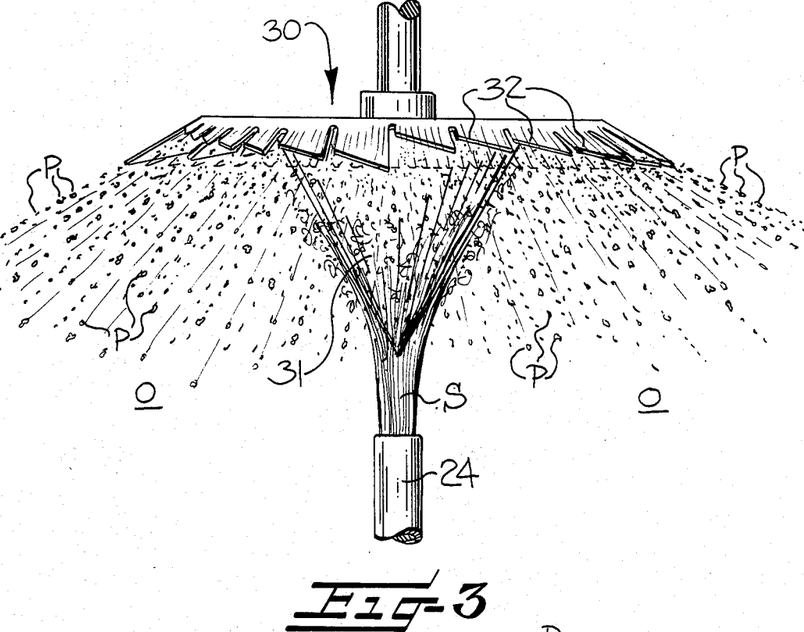
FIG. 3 is an enlarged schematic view of the impeller device utilized in the apparatus of this invention and showing its action on a stream of wastewater.

The hydraulic mixing means further includes baffles 43 positioned adjacent the interior wall of the vessel 10 in the lower portion 11 thereof for containing the oxygen diffusing tubes 21 between the baffles 43 and the interior wall of the vessel 10 so that the bubbles of oxygen are diffused upwardly between the baffles 43 and the interior wall of the vessel 10 to further aid in causing the helical flow of the wastewater (as indicated diagrammatically in FIG. 2).

With the use of a treatment vessel 10 of the length illustrated in FIG. 1, a plurality of the circulation means 22, impeller devices 30 and hydraulic mixing means will be positioned at successive locations along the elongate vessel 10 for successive treatments of the wastewater with the oxygen to further aid in absorption of the oxygen by the wastewater. These devices will be so positioned that the generally conical pattern of expelled particles P of wastewater through the oxygen-rich atmosphere O will overlap each other so as to obtain maximum benefit of the oxygen-rich atmosphere O in the upper portion 12 of the vessel 10 and maintain the turbulent zone created at the upper surface L' of the liquid level L of wastewater by the particles P striking such upper surface L' throughout the length of the vessel 10.

In the above described drawings and the detailed description set forth above there has been set forth a preferred embodiment of this invention and, although specific terms are employed, they are used in a generic and descriptive sense only and not for purposes of limitation.

What is claimed is:

1. Process for continuously treating sewage wastewater, such as wastewater sludge, by chemical oxidation of the contaminants and characterized by a high degree of oxygen absorption and utilization, said process comprising the steps of:

continuously depositing liquid wastewater to be treated at on end of an elongate vessel to define a liquid level having an upper surface within the vessel;

continuously removing the treated wastewater from the other end of the vessel at generally the same rate as the wastewater is deposited in the vessel to maintain the desired liquid level within vessel;

supplying oxygen under pressure in the form of a mixture of $O_2$ and $O_3$ into the vessel to chemically treat the wastewater by absorption of the oxygen by the wastewater, while pressurizing the vessel and creating an oxygen-rich atmosphere in an upper portion of the vessel above the liquid level;

continuously circulating the wastewater from the lower portion of the vessel through the oxygen-rich atmosphere in the upper portion of the vessel by withdrawing a portion of the wastewater from the lower portion of the vessel and expelling the wastewater in a stream upwardly through the oxygen-rich atmosphere in the upper portion of the vessel;

substantially increasing and changing the interfacial area between the wastewater and the oxygen for increased absorption of the oxygen by the wastewater by directing the upwardly expelled stream of wastewater into contact with a motor driven rotating impeller at generally the top of the upper portion of the vessel having a generally conical-shaped member with a plurality of fins thereon positioned in the stream of wastewater while rotating the impeller so as to break the wastewater into a myriad of small particles and forcibly impelling the particles downwardly through the oxygen-rich atmosphere in the upper portion of the vessel in a generally straight-line path of travel and at a velocity greater than that which would be produced by the particles falling by the force of gravity whereby the particles forcibly strike the upper surface of the wastewater in the vessel and create a turbulent zone at the upper surface of the wastewater; and hydraulically mixing the wastewater for further increasing oxygen absorption by creating a generally helical flow of the wastewater through the lower portion of the vessel from the one end to the other end so as to continuously change the interface between the wastewater and the oxygen at the upper surface of the wastewater.

2. Process for continuously treating sewage wastewater, as set forth in claim 1, further including causing the small particles of wastewater to spin during the impelling of the particles downwardly through the oxygen-rich atmosphere for increased oxygen absorption by contacting the stream of wastewater with a plurality of fins on the impeller which impart a generally tangential force to the particles.

3. Process for continuously treating sewage wastewater, as set forth in claim 1, in which said step of supplying oxygen includes diffusing the oxygen into the wastewater in the vessel in tiny bubles to bubble-up through the wastewater to the oxygen-rich atmosphere in the upper portion of the vessel while being partially absorbed by the wastewater during the diffusing.

4. Process for continuously treating sewage wastewater, as set forth in claim 3, in which said step of diffusing the oxygen into the wastewater further includes diffusing the oxygen at one side of the lower portion of the vessel and between an inside wall of the vessel and a baffle positioned within the vessel to aid in the hydraulic mixing of the wastewater.

5. Process for continuously treating sewage wastewater, as set forth in claim 1 or 4 in which said step of hydraulically mixing the wastewater includes separating a portion of the wastewater withdrawn from the lower portion of the vessel during said circulating step and reintroducing under pressure the separated portion of the wastewater into the wastewater in the lower portion of the vessel at a downwardly extending angle to the upper surface of the wastewater and upteam or in advance of the point at which the wastewater is withdrawn for creating the generally helical flow of the wastewater.

6. Process for continuously treating sewage wastewater, such as wastewater sludge, by chemical oxidation of the contaminants and characterized by a high degree of oxygen absorption and utilization, said process comprising the steps of:

continuously depositing liquid wastewater to be treated at one end of an elongate enclosed vessel to define a liquid level having an upper surface within the vessel;

continuously removing the treated wastewater from the other end of the vessel at generally the same rate as the wastewater is deposited in the vessel to maintain the desired liquid level within the vessel;

diffusing oxygen under pressure in the form of a mixture of $O_2$ and $O_3$ into the wastewater in the lower portion of the vessel in tiny bubbles to bubble-up through the wastewater for being partially absorbed by the wastewater and for creating an oxygen-rich atmosphere in an upper portion of the vessel above the liquid level to chemically treat the wastewsater by absorption of the oxygen by the wastewater;

continuously circulating the wastewater from the lower portion of the vessel through the oxygen-rich atmosphere in the upper portion of the vessel by withdrawing a portion of the wastewater from the lower portion of the vessel and expelling the wastewater in a stream upwardly through the oxygen-rich atmosphere in the upper portion of the vessel;

substantially increasing and changing the interfacial area between the wastewater and the oxygen for increased absorption of the oxygen by the wastewater by directing the upwardly expelled stream of liquid waste into contact with a motor driven rotatiang impeller having a generally conical-shaped member with a plurality of fins thereon of different lengths and positioned at different angles in the stream of wastewater while rotating the impeller so as to break the wasterwater into a myriad of small particles, causing such small particles to spin and forcibly impelling the particles downwardly through the oxygen-rich atmosphere in a generally straight-line path of travel and at a velocity greater than that which would be produced by the particles falling by the force of gravity whereby the particles forcibly strike the upper surface of the wastewater in the vessel and create a turbulent zone at the upper surface of the wastewater; and hydraulically mixing the wastewater for further increasing oxygen absorption by creating a generally helical flow of the wastewater through the lower portion of the vessel from the one end to the other end, while further changing the interface between the wastewater and the oxygen at the upper surface of the wastewater; by separating a portion of the wastewater withdrawn from the lower portion of the vessel during said circulating step and reintroducing under pressure the separated portion of the wastewater into the wastewater in the lower portion of the vessel at a downwardly extending angle to the upper surface of the wastewater and upstream or in advance of the point at which the wastewater is withdrawn, and by diffusing the oxygen into the wastewater at one side of the lower portion of the vessel and between an inside wall of the vessel and a baffle positioned within the vessel.

7. Process for continuously treating sewage wastewater, as set forth in claim 1 or 6, in which said steps of continuously circulating the wastewater from the lower portion of the vessel through the oxygen-rich atmosphere in the upper portion of the vessel and directing the stream of wastewater against an independently driven rotating impeller are performed at several successive portions along the elongate vessel to further aid in absorption of the oxygen by the wastewater.

8. An apparatus for continuously treating sewage wastewater, such as wastewater sludge, by chemical oxidation of the contaminants and characterized by a high degree of oxygen absorption and utilization, said apparatus comprising:

an elongate enclosed vessel defining a lower portion and an upper portion therein and including inlet means at one end thereof for continuously receiving liquid wastewater in said lower portion to define a liquid level having an upper surface, and outlet means at the other end thereof for continuously discharging the treated wastewater;

means connected to said vessel for supplying oxygen gas under pressure in the form of a mixture $O_2$ and $O_3$ into said vessel for pressurizing said vessel and creating an oxygen-rich atmosphere in said upper portion of said vessel above said liquid level;

circulation means for continuously withdrawing the wastewater from said portion of said vessel and expelling a stream of such liquid wastewater upwardly through the oxygen-rich atmosphere in said upper portion of said vessel;

motor ddriven rotating impeller means positioned at generally the top of said upper portion of said vessel and in the path of the stream of the wastewater expelled by said circulation means and comprising a generally conical-shaped member with a plurality of fins thereon for breaking the wastewater into a myriad of small particles and for forcibly impelling such particles downwardly through the oxygen-rich atmosphere in a generally straight-line path of travel and at a velocity greater than that which would be produced by the particles falling by the force of gravity so that the particles forcibly strike the upper surface of the wastwater in said lower portion of said vessel and create a turbulent zone, whereby the interfacial area between the wastewater and the oxygen is substantially increased for enhanced absorption of the oxygen by the wastewater; and means for creating a generally helical flow of the wastewater through said lower portion of said vessel from said one end to said other end of hydraulically mixing the wastewater to further increase oxygen absorption by further changing the interface between the wastewater and the oxygen at the upper surface of the wastewater.

9. A treatment apparatus, as set forth in claim 8, in which said rotating impeller means comprises a generally conical-shaped member extending downwardly toward and generally along the longitudinal axis of the stream of wastewater being expelled by said circulation means and generally perpendicular to the upper surface of the wastewater, and a plurality of fins extending around the outside of the base of said conical member and being of different lengths and positioned at different angles with respect to the longitudinal axis of the stream of wastewater for additionally striking the particles of wastewater generally tangentially and causing the particles of wastewater to spin during the impelling of the particles downwardly through the oxygen-rich atmosphere for increased absorption of the oxygen by the wastewater.

10. A treatment apparatus, as set forth in claim 8, in which said means for supplying oxygen under pressure comprises gas diffusing means positioned in said lower portion of said vessel beneath the upper surface of the wastewater for diffusing the oxygen into the wastewater in tiny bubbles to bubble-up through the wastewater to the oxygen-rich atmosphere in said upper portion of said vessel while being partially absorbed by the wastewater during the diffusing.

11. A treatment apparatus, as set forth in claim 10, further including baffle means positioned adjacent the interior wall of said vessel in said lower portion thereof and in which said diffusing means are located between said baffle means and said interior wall of said vessel for aiding in the hydraulic mixing of the wastewater during the diffusing of the bubbles of oxygen into the wastewater.

12. A treatment apparatus, as set forth in claim 8, in which said circulation means comprises outlet means in said vessel at generally the bottom of said lower portion and generally beneath said impeller means, conduit means extending from said exit means around a portion of the outside of said vessel, back into said vessel and upwardly toward said impeller means, and pump means.

13. A treatment apparatus, as set forth in claim 12, in which said means for hydraulically mixing the wastewater includes conduit means having pump means therein and extending from said outlet means of said circulation means for separating a portion of the wastewater withdrawn from the lower portion of said vessel and extending around a portion of the outside of said vessel and back into said vessel in said lower portion at a point upstream or in advance of the point at which the wastewater is withdrawn and at a downwardly extending angle to the upper surface of the wastewater for reintroducing the wastewater into said lower portion of said vessel to create the generally helical flow of the wastewater.

14. An apparatus for continuously treating sewage wastewater, such as wastewater sludge, by chemical oxidation of the contaminants and characterized by a high degree of oxygen absorption and utilization, said apparatus comprising:

an elongate enclosed vessel defining a lower portion and an upper portion therein and including inlet means at one end thereof for continuously receiving liquid wastewater in said lower portion to define a liquid level having an upper surface, and outlet means at the other end thereof for continously discharging the treated wastewater;

gas diffusing means connected to said vessel for diffusing oxygem gas under pressure in the form of a mixture $O_2$ and $O_3$ into said lower portion of said vessel in tiny bubbles to bubble-up through the wastewater for being partially absorbed by the wastewater and for pressurizing said vessel and for creating an oxygen-rich atmosphere in said upper portion of said vessel above said liquid level;

circulation means for continuously withdrawing the wastewater from said lower portion of said vessel and expelling a stream of such wastewater up through the oxygen-rich atmosphere in said upper portion of said vessel and comprising outlet means in said vessel at generally the bottom of said lower portion, conduit means extending from exit means around a portion of the outside of said vessel, back into said vessel and upwardly through said upper portion of said vessel, and pump means;

motor driven rotating impeller means positioned at generally the top of said upper portion of said vessel and in the path of the stream of wastewater expelled by said circulation means and comprising a generally conical-shaped member extending downwardly toward an generally along the longitudinally axis of the stream of wastewater being expelled by said circulation means and generally perpendicular to the upper surface of the waste water and a plurality of fins extending around the outside of the base of said conical member and being of different lengths and position at different angles with respect to the longitudinally axis of the stream of wastewater for breaking the wastewater into a myriad of small particles, for striking the particles of wastewater generally tangentially and causing such particles to spin, and for impelling such spinning particles downwardly through the oxygen-rich atmosphere in a generally straight-line path of travel and a generally conical pattern of particles and at a velocity greater than that which would be produced by the particles falling by the force of gravity so that the spinning particles forcible strike the upper surface of the wastewater in said lower portion of said vessel and create a tubularent zone, whereby the interfacial area between the wastewater and the oxygen is substantially increased for enhanced absorption of oxygen by the waterwater; and means for hydraulically mixing the wastewater to further increase oxygen absorption by further changing the interface between the wastewater and the oxygen at the upper surface of the wastewater and comprising conduit means having pump means therein and extending from said outlet means of said circular means for separating a portion of the wastewater from the lower portion of said vessel and extending around a portion of the outside of said vessel and back into said vessel in said lower portion at a point upstream or in advance of the point at which the water is withdrawn and at a downwardly extending angle to the upper surface of the wastewater for reintroducing the wastewater into said lower portion of said vessel to create a generally helically flow of the wastewater through said lower portion of said vessel from said one end to said other end, and baffle means positioned adjacent the interior wall of said vessel in said lower portion thereof for containing said diffusing means between said baffle means and the interior wall of said vessel so that the bubbles of oxygen are diffused upwardly between said baffle means and the interior wall of said vessel to aid in causing the helical flow of the wastewater.

15. A treatment apparatus, as set forth in claim 8 to 14, in which said circulation means and said rotating impeller means comprise a plurality of such means positioned at successive locations along said elongate vessel to further aid in absorption of the oxygen by the wastewater.

16. Apparatus for treatment of liquid waste to provide chemical oxidation of the contaminants and characterized hy a high degree of oxygen absorption and utilization, said apparatus comprising:

an enclosed vessel adapted for receiving liquid waste, the liquid waste filling a lower portion of the vessel and defining an upper liquid level surface at a medial location within the vessel;

baffle means provided in the lower portion of the vessel adjacent a side wall thereof and beneath the liquid level surface and forming a liquid circulation passageway between the baffle means and the wall of the vessel;

gas diffusing means positioned in a lower portion of said vessel beneath the surface of the liquid and located in the liquid circulation passageway defined between said baffle means and the wall of the vessel and being adapted for diffusing gas into the liquid in the form of tiny bubbles of $O_2$ and $O_3$ so as to bubble up through the liquid and to form a pressurized oxygen-rich atmosphere in the upper portion of the vessel above the liquid level whereby the gas is partially absorbed by the liquid while also creating an upward circulation of the liquid in the liquid circulation passageway;

liquid circulation means for providing forced circulation of the liquid waste within the vessel and including conduit means having an inlet located adjacent the bottom of the vessel for withdrawing the liquid from the vessel, outlet means positioned for discharging a stream of the liquid upwardly through the pressurized oxygen-rich atmosphere in the upper portion of the vessel, and pump means cooperating therewith for creating said forced circulation of the liquid through the conduit;

motor driven rotating impeller means positioned within the vessel at generally the top of said upper portion thereof and in the path of the stream of liquid expelled upwardly by said circulation means, said impeller means comprising a generally conical shaped member extending downwardly toward and generally along the longitudinal axis of the stream of liquid being expelled by said circulation means and a plurality of fins extending around the outside of the base of said conical member and being positioned at different angles with respect to the longitudinal axis of the stream of liquid for breaking the liquid into a myriad of small particles, for striking the particles of liquid generally tangentially and causing such particles to spin, and for impelling such spinning particles downwardly through the oxygen-rich atmosphere in a generally straight-line path of travel and in a generally conical pattern of particles and at a velocity greater than that which would be produced by the particles falling by the force of gravity so that the spinning particles forcibly strike the upper surface of the liquid in said lower portion of the vessel and create a tubulent mixing zone whereby the interfacial area between the liquid and the oxygen is substantially increased for enhanced absorption of the oxygen by the liquid; and means for hydraulically mixing the liquid to further increase oxygen absorption by further changing the interface between the liquid and the oxygen at the upper surface of the liquid and comprising conduit means having pump means therein and extending from said outlet means of said circulation means for separating a portion of the liquid withdrawn from the lower portion of said vessel and including outlet means oriented at a downwardly extending angle to the upper surface of the liquid for reintroducing the liquid into said lower portion of said vessel to create a circulated flow of the liquid through the lower portion of the vessel for additionally mixing the liquid and constantly changing the liquid present at said turbulent mixing zone adjacent the upper surface to further aid in absorption of the oxygen by the liquid.

* * * * *

UNITED STATES PATENT AND TRADEMARK OFFICE
CERTIFICATE OF CORRECTION

PATENT NO. : 4,652,382
DATED : March 24, 1987
INVENTOR(S) : Richard N. Edwards (Deceased)

It is certified that error appears in the above-identified patent and that said Letters Patent is hereby corrected as shown below:

Column 4, line 18, "bubbleup" should be -- bubble-up --.

Column 4, line 64, after 22 insert --. --.

Column 6, line 52, "on" should be -- one --.

Column 6, line 58, after the word "within" insert -- the --.

Column 9, line 24, after the word "said" insert the word -- lower --.

Column 9, line 28, "ddriven" should be -- driven --.

Column 9, line 40, "wastwater" should be -- wastewater --.

Column 9, line 48, "of" should be -- for --.

Column 10, line 54, "oxygem" should be -- oxygen --.

Column 10, line 67, before "exit" insert -- said --.

Column 11, line 8, "an" should be -- and --.

Column 11, line 14, "position" should be -- positioned --.

Column 11, line 15, "longitudinally" should be -- longitudinal --.

Column 11, lines 24-25, "forcible" should be -- forcibly --.

Column 11, lines 26-27, "tubularent" should be -- turbulent --.

UNITED STATES PATENT AND TRADEMARK OFFICE
CERTIFICATE OF CORRECTION

PATENT NO. : 4,652,382

DATED : March 24, 1987

INVENTOR(S) : Richard N. Edwards (Deceased)

It is certified that error appears in the above-identified patent and that said Letters Patent is hereby corrected as shown below:

Column 11, line 30, "waterwater" should be -- wastewater --.

Column 11, line 37, "circular" should be -- circulation --.

Column 11, line 42, "water" should be -- wastewater --.

Column 11, line 55, "to" should be -- or --.

Column 12, line 48, "tubulent" should be -- turbulent --.

On the title page assignee should read

-- Ozonics Corporation, Gaithersburg, Maryland --.

Signed and Sealed this

Thirteenth Day of October, 1987

Attest:

DONALD J. QUIGG

Attesting Officer

Commissioner of Patents and Trademarks